United States Patent [19]

Chervitz

[11] 4,232,684

[45] Nov. 11, 1980

[54] FEVER THERMOMETER

[76] Inventor: Melvin Chervitz, c/o E. Z. Temp, Inc., P.O. Box 27505, St. Louis, Mo. 63141

[21] Appl. No.: 924,507

[22] Filed: Jul. 14, 1978

[51] Int. Cl.$^3$ ............................................. A61B 10/00
[52] U.S. Cl. .................................................. 128/736
[58] Field of Search ........................... 128/736; 73/356

[56] References Cited

U.S. PATENT DOCUMENTS

| | | | |
|---|---|---|---|
| 3,465,590 | 9/1969 | Kluth et al. | 73/356 |
| 3,661,142 | 5/1972 | Flam | 128/2 H |
| 3,817,103 | 6/1974 | Diamond et al. | 73/356 |
| 3,893,340 | 7/1975 | Parker | 73/356 |
| 4,030,482 | 6/1977 | Navato | 128/2 H |

*Primary Examiner*—William E. Kamm
*Attorney, Agent, or Firm*—Cohn, Powell & Hind

[57] ABSTRACT

A fever thermometer having an adhesive on one side of a flexible backing web for adhering the web to the skin of the human body, the web being provided with a background color, and having a plurality of numerical display areas on the opposite side of the web, each numerical display area including an encapsulated liquid crystal indicator, the color spectrum of each liquid crystal indicator being responsive to a different specific temperature range, and the liquid crystal indicators being initially of a color to compliment the background color so as to be substantially invisible at temperatures below the minimum threshold temperature of the indicator having the lowest temperature range. A directional indicator is provided on the opposite side of the web for enabling adherence of the web with the numerical display areas in a predetermined attitude when the numerical display areas are substantially invisible at temperatures below the minimum threshold temperature so that the numerical display areas can be easily read when made visible at temperatures with the responsive temperature ranges of the liquid crystal indicators. The directional indicator is of a color contrasting with the background color so as to be visible at all times.

1 Claim, 3 Drawing Figures

FEVER THERMOMETER

BACKGROUND OF THE INVENTION

This invention relates generally to a fever thermometer, and more particularly, to a thermometer that may be adhesively applied to the skin of the human body and which indicates the body temperature.

Reference is made to U.S. Pat. Nos. 3,661,142 and 4,030,482 for disclosure of thermometers in the same general art as this invention in which the thermometers utilize layers of encapsulated liquid crystals that change colors in response to changes in temperature within a predetermined temperature range to indicate the skin temperature of the body. As is conventional, these thermometers use a flexible backing web of plastic film or the like with a pressure-sensitive adhesive applied thereto so that the thermometer may be readily adhered to the skin.

In those fever thermometers of the type disclosed in U.S. Pat. No. 4,030,482, the liquid crystal indicators are initially of a color to compliment the background color applied to the flexible backing web so that the numerical display areas are substantially invisible at temperatures below a minimum threshold temperature of the indicator having the lowest temperature range. As a result, when such fever thermometer is applied to the skin under usual ambient temperatures, the attitude of the numerical display areas is not known or is not readily discernible. Accordingly, the thermometer may be adhesively applied with the attitude of the numerical display areas such that they cannot be easily read when they are made visible at temperatures within the responsive temperature ranges of the liquid crystal indicators. In such event, the thermometer may have to be removed and reapplied until the desired attitude is achieved.

SUMMARY OF THE INVENTION

The present fever thermometer includes a directional indicator for enabling adherence of the web with the numerical display areas in a predetermined attitude when the numerical display areas are substantially invisible at temperatures below the minimum threshold temperature of the indicator having the lowest temperature range so that the numerical display areas can be easily read when made visible at temperatures within the responsive temperature ranges of the liquid crystal indicators.

The fever thermometer includes an adhesive on one side of a flexible backing web for adhering the web to the skin of the human body, the web being provided with a background color. A plurality of numerical display areas are provided on the opposite side of the web, each numerical display area including an encapsulated liquid crystal indicator, the color spectrum of each liquid crystal indicator being responsive to a different specific temperature range, and the liquid crystal indicators being initially of a color to compliment the background color so as to be substantially invisible at temperatures below a minimum threshold temperature of the indicator having the lowest temperature range. A directional indicator is provided on the web for enabling adherence of the web with the numerical display areas in a predetermined attitude when the numerical display areas are substantially invisible at temperatures below the minimum threshold temperature so that the numerical display areas can be easily read when made visible at temperatures within the responsive temperature ranges of the liquid crystal indicators.

The directional indicator is of a color that contrasts with the background color so as to be visible at all times.

Preferably, the directional indicator extends substantially transversely of the web, and the numerical display areas are disposed about and spaced from the directional indicator.

A mask is provided on the web having substantially the same color as the background color, the mask being provided with windows disposed over and exposing the liquid crystal indicators to provide the numerical display areas. The directional indicator is provided on the mask.

More particularly, the mask is provided with a window that is disposed over means providing a color contrasting with the background color so that such contrasting color is visible through the window and enables the window to be used as a directional indicator.

In the fever thermometer, the directional indicator window extends substantially transversely of the center of the web, and the windows exposing the liquid crystal indicators form temperature numerals, the liquid crystal indicators and associated numerical windows being disposed about and spaced from the directional indicator window.

DESCRIPTION OF THE PREFERRED EMBODIMENT

Figure 2:
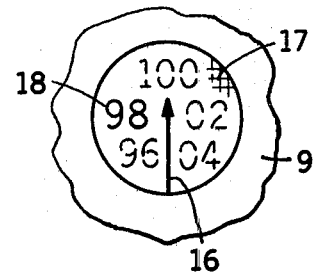
FIG. 2 is a front elevational view of the thermometer attached to a body, and illustrating the arrangement of the directional indicator and the associated numerical display areas.

Referring now by characters of reference to the drawing, it will be understood that the fever thermometer includes a clear plastic web 10 provided with an adhesive 11 on one side for adhering the web 10 to the skin of a human body 9 (FIG. 2). The adhesive 11 may be any pressure-sensitive adhesive which may be safely applied to the human body 9. Various types of adhesive that may be utilized are fully disclosed in U.S. Pat. Nos. 3,661,142 and 4,030,482. A removable backing strip 12 is applied to the adhesive 11 to protect it, as is conventional. This backing strip 12 may be peeled off prior to applying the thermometer to the body 9.

Figure 3:
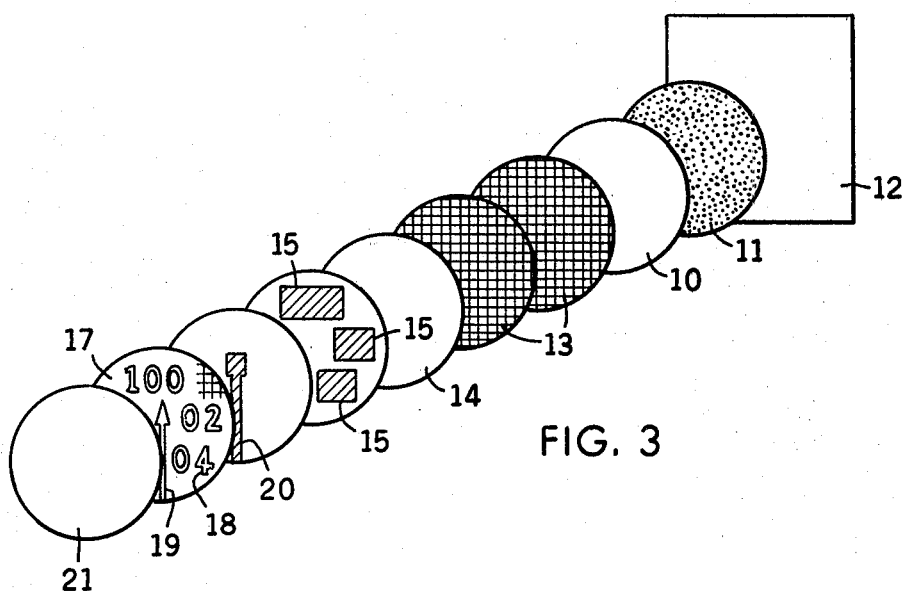
FIG. 3 is an exploded view of the thermometer illustrating the construction.

The flexible backing web 10 is provided with a background color. For example, the other side of the web 10 may be coated with any suitable material such as paint or ink. As shown in FIG. 3, this background color coating is applied in layers 13 of carbon black to provide a flat black color, and is applied as thin as possible so as not to affect heat transfer adversely. The various types of black color coatings that can be utilized to provide the background color are disclosed in U.S. Pat. No. 4,030,482. Also, the plastic web 10 may be of any suitable impregnated color, i.e., to provide a black plastic web.

The background color layers 13 are then covered with a layer of transparent material constituting a color intensifier, the transparent layer 13 being of a water soluable acrylic spray or a clear lacquer.

A plurality of numerical display areas are provided on the opposite side of the web, each numerical display area including an ELC (encapsulated liquid crystal) indicator 15 deposited on the top of the transparent material layer 14 as by brushing, spraying or by silk-screen printing methods. The color spectrum of each ELC indicator 15 is responsive to a different specific temperature range. These ELC formulations are commerically available and are typically an emulsified mixture with particles of the liquid crystal encapsulated in small gelatin capsules nominally having diameters ranging from two (2) to fifty (50) microns. The ELC indicators 15 are initially of a color to compliment the background color of the web 10 so as to be substantially invisible at temperatures below the minimum threshold temperature of the ELC indicator 15 having the lowest temperature range. Preferably, the ELC indicators 15 will appear to be black below such minimum threshold temperature to blend in with the black background color provided to the web 10.

The various ELC indicator formulations that can be utilized to indicate various temperature ranges are of the type fully disclosed in U.S. Pat. Nos. 3,661,142 and 4,030,482.

After the ELC indicators 15 are applied, such indicators 14 are then covered with another protective clear transparent material layer of a type similar to the transparent material layer 14 previously described.

It will be understood that the various ELC indicators 15 are arranged substantially about the periphery of the web 10 with the ELC indicator 15 having the lowest temperature range located at the lower left side and each indicator 14 of successive higher temperature range being located in clockwise spaced relationship about the web periphery.

Figure 1:
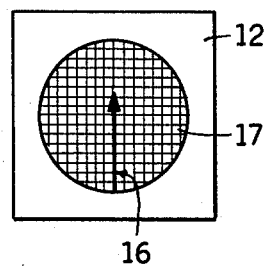
FIG. 1 is a front elevational view of the fever thermometer.

A directional indicator, generally indicated by 16 in FIGS. 1 and 2, is also provided on the backing web 10, the directional indicator 16 enabling adherence of the web 10 with the numerical display areas in a predetermined attitude when the numerical display areas are substantially invisible at temperatures below the minimum threshold temperature of the ELC indicator 15 having the lowest temperature range so that the numerical display areas can be easily read when made visible at temperatures within the responsive temperature ranges of the ELC indicators 15.

A mask 17 having substantially the same color, as for example black, as the background color is disposed over the ELC indicators 15. The mask 17 is provided with windows 18 disposed over and exposing the associated ELC indicators 15 to provide the numerical display areas, the windows 18 forming temperature numerals that are correlated to substantially the mean temperature of the associated ELC indicator 15.

Further, the mask 17 is provided with an elongate window 19 in the configuration of a directional arrow extending substantially transversely of the center of the web. A color layer 20 is provided behind and is visible through the directional indicator window 19, the color layer 20 being of a color such as white to contrast with the background color so as to be visible at all times. The directional indicator 16, provided by the directional window 19 and contrasting color layer 20, indicate the attitude at which the thermometer numbers can be easily read. The numerical display areas are disposed about and spaced from the directional indicator 16.

The top layer 21 of the thermometer is provided by a clear plastic sheet that is adhered to the top of the mask 17.

The temperature numbers associated with the ELC indicators 15 are correlated to the body or oral temperature so that rather than indicating the skin or tissue temperature immediately behind the thermometer, the body temperature is indicated. Generally, body temperature correlates with skin temperature at known locations on the body. Accordingly, when the thermometer is applied to a known location and a particular ELC indicator 14 is visible, the associated temperature number will read out the true body temperature.

To use the fever thermometer, the protective backing strip 12 is peeled from the adhesive 11 and the thermometer is adhesively secured to the body 9 with the directional indicator 16 pointing in a direction so that the numerical display areas, which have the same general attitude, can be easily read. It will be understood that at normal room or ambient temperatures at which the thermometer is applied, the entire front face of the thermometer is substantially the same color as the background color of the backing web 10, i.e., the color black in the preferred embodiment. Because such ambient or room temperature is below the threshold temperature of the ELC indicator 15 having the lowest temperature range, none of the ELC indicators 15 are visible. However, the directional indicator 16 is visible at all times because it is of a color, i.e., the color white in the preferred embodiment, so that the numerical display areas can be placed in a predetermined attitude so that the numerical display areas can be easily read when the ELC indicators 15 are made visible at temperatures within the responsive temperature ranges of the ELC indicators 15. If the directional indicator 16 were not present in this thermometer, the attitude of the numerical display areas would not be readily determined under these conventional ambient temperatures, and the thermometer could be unintentionally adhered to the body 9 in an upside down position or some other attitude in which the numerical display areas could not easily be read.

I claim as my invention:

1. A fever thermometer comprising:
   (a) a flexible backing web provided with a background color,
   (b) an adhesive on one side of the web for securing the web to the skin of the human body,
   (c) a plurality of numerical display areas in a predetermined attitude on the opposite side of the web, each numerical display area including an encapsulated liquid crystal indicator being responsive to a different specific temperature range, and the liquid crystal indicators being initially of a color to compliment the background color so as to be substantially invisible at temperatures below a minimum threshold temperature of the indicator having the lowest temperature range which is above the usual ambient temperature at which the thermometer is applied to the skin,
   (d) a directional indicator on the said opposite side of the web for enabling adherence of the web with the numerical display areas in the predetermined attitude when the numerical display areas are substantially invisible at the usual ambient temperatures below the minimum threshold temperature when the thermometer is applied to the skin so that the numerical display areas can be easily read when made visible at temperatures within the responsive temperature ranges of the liquid crystal indicators after the thermometer is applied to the skin, (e) a mask overlying the liquid crystal indicators, the mask having substantially the same color as the background color, and the mask being provided with windows disposed over and exposing the liquid crystal indicators to provide the numerical display areas, and (f) the directional indicator is provided by:
   (1) a window in the mask, and
   (2) means providing a color contrasting with the background color located behind and visible through the directional indicator window.

* * * * *